J. J. MANN.
Thill-Coupling
No. 209,491.  Patented Oct. 29, 1878.
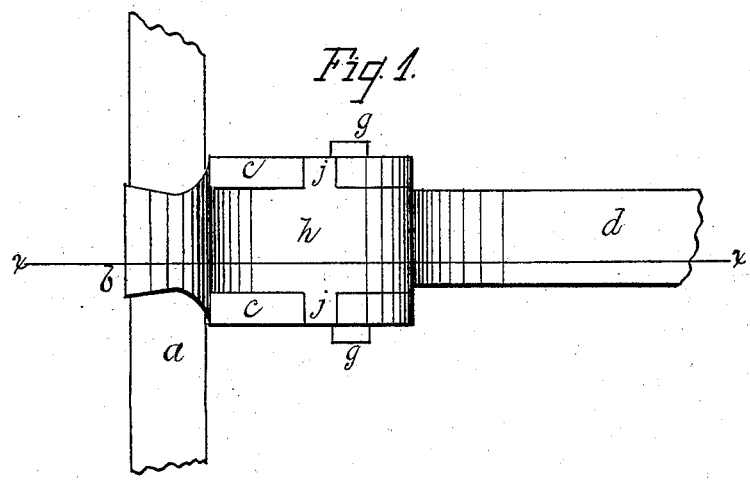
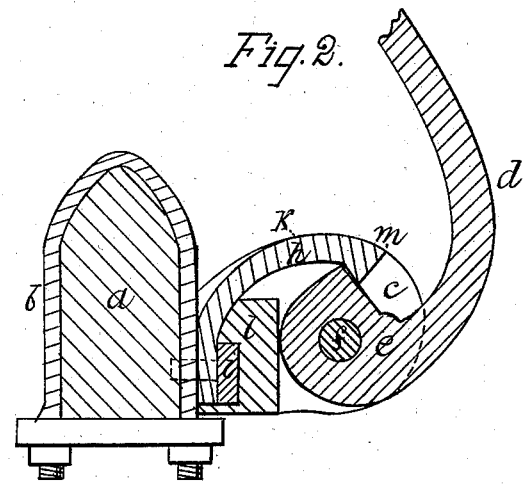
Witnesses:
A. D. Packard
James H. Hunter
Inventor:
John J. Mann

UNITED STATES PATENT OFFICE.

JOHN J. MANN, OF TAPPAN, NEW YORK.

IMPROVEMENT IN THILL-COUPLINGS.

Specification forming part of Letters Patent No. 209,491, dated October 29, 1878; application filed October 2, 1878.

*To all whom it may concern:*

Be it known that I, JOHN J. MANN, of Tappan, in the county of Rockland and State of New York, have invented a new and useful Improvement in Thill-Couplings, of which the following is a full, clear, and exact description, reference being had to the drawings accompanying and forming a part of the same.

The object of my invention is to provide a simple-working, safe, and reliable coupling for locking the thills at an elevation to be out of the way; and it consists in a novel construction and arrangement of the parts to that end, as will be hereinafter particularly described.

In the accompanying drawings, Figure 1 is a plan view of my improved thill-coupling; and Fig. 2 is a vertical central section, showing the locking of the thill-head when the thills are elevated.

$a$ represents the axle; $b$, the clip, which is bolted to the axle in any well-known manner. The clip $b$ is provided with side extension-pieces $c\ c$, which serve as bearings for the bolt upon which the thill-head works, and also as lateral bearings for the independent spring-plate, as hereinafter described.

$d$ is the thill-iron, which terminates in a cam-shaped head, $e$, which is hung between the side flanges of the clip working upon the bolt $f$, which has its bearings in the side flanges $c\ c$, and is held in position by nuts $g\ g$.

$h$ is a curved spring-plate, which is bolted to the clip at $i$, and has side lateral projections $j\ j$, which, when the spring-plate is in its normal condition, rest in corresponding slots $k\ k$ formed in the side flanges $c\ c$ of the clip.

The spring-plate $h$ is provided with a beveled flange, $m$, which, when the cam-head comes in contact with it, forms a perfect locking mechanism for the thills.

$l$ is a block of rubber or other elastic material interposed between the cam-head $e$ and the base of the spring-plate $h$.

One side of the rubber is provided with a square recess to enable it to fit snugly over the bolt-head $i$, which serves to hold it in position, forming a yielding bearing for the cam-head, and serving as a complete protection against the accumulation of dust about the working parts.

In coupling, the thill is raised and the cam-head is brought into contact with the beveled flange $m$ of the spring-plate $h$, as seen in Fig. 2, which operates as a latch to hold the thills in safety out of the way. In uncoupling, the cam-head is sprung past the beveled flange and released.

My improved device is very simple in construction. Its operation is accomplished with ease and rapidity.

The nice adjustment of the elastic pad serves to keep the working parts in close contact, prevents vibration and rattling, and forms a protection against the entrance of dirt and dust, thus rendering the coupling more secure and durable.

What I claim as new, and desire to secure by Letters Patent, is—

1. The combination, with the clip $b$, having side flanges $c\ c$, and the thill-iron $d$, having a cam-shaped head, $e$, pivoted upon a transverse bolt, $f$, which has its ends arranged in the side flanges of the clip, of the curved spring-plate $h$, bolted to the clip between the side flanges, and having the beveled flange $m$, all substantially as and for the purpose described.

2. The combination, with the clip $b$, having side flanges $c$, provided with slots $k$, and the thill-iron $d$, constructed with the cam-shaped head $e$, pivoted upon the transverse bolt $f$, which has its ends arranged in the side flanges of the clip, of the curved spring-plate $h$, bolted to the front face of the clip, and having lateral projections $i$ and beveled flange $m$, all substantially as and for the purpose described.

3. The curved spring-plate $h$, attached to the clip $b$ by the headed bolt $i$, in combination with the thill-iron $d$, having the cam-head $e$, pivoted on the transverse bolt $f$, and the elastic pad $l$, having a recess fitting the head of the bolt $i$, all substantially as and for the purpose described.

JOHN J. MANN.

Witnesses:
A. D. PACKARD,
JAMES H. HUNTER.